US010303576B1

(12) United States Patent
Seymour et al.

(10) Patent No.: US 10,303,576 B1
(45) Date of Patent: May 28, 2019

(54) SYSTEMS AND METHODS FOR IT INTELLIGENCE AND MANAGEMENT BASED ON CONTAINER-LEVEL METERING

(71) Applicant: 6FUSION USA, INC., Raleigh, NC (US)

(72) Inventors: Delano Seymour, St George's (BM); Douglas Steele, Grand Cayman (KY); John Cowan, Raleigh, NC (US)

(73) Assignee: 6FUSION USA, INC., Raleigh, NC (US)

( * ) Notice: Subject to any disclaimer, the term of this patent is extended or adjusted under 35 U.S.C. 154(b) by 0 days.

(21) Appl. No.: 16/038,936

(22) Filed: Jul. 18, 2018

Related U.S. Application Data (60) Provisional application No. 62/666,910, filed on May 4, 2018.

(51) Int. Cl.
| | |
|---|---|
| *G06F 9/46* | (2006.01) |
| *G06F 9/455* | (2018.01) |
| *G06F 11/34* | (2006.01) |
| *G06F 11/30* | (2006.01) |
| *G06Q 40/06* | (2012.01) |
| *H04L 12/24* | (2006.01) |
| *G06F 16/25* | (2019.01) |

(52) U.S. Cl.
CPC ...... *G06F 11/3442* (2013.01); *G06F 9/45558* (2013.01); *G06F 11/3051* (2013.01); *G06F 11/3082* (2013.01); *G06F 11/3433* (2013.01); *G06F 16/254* (2019.01); *G06Q 40/06* (2013.01); *H04L 41/5029* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 7,499,968 | B1 * | 3/2009 | Alexander | G06Q 10/06 705/412 |
| 7,672,882 | B2 * | 3/2010 | Agarwal | G06Q 20/102 705/30 |
| 7,756,989 | B2 * | 7/2010 | Goldszmidt | G06F 9/505 370/231 |
| 8,046,763 | B1 * | 10/2011 | Czajkowski | G06F 9/5011 709/223 |
| 8,145,455 | B2 * | 3/2012 | Cherkasova | G06F 9/5083 703/2 |
| 8,260,603 | B2 * | 9/2012 | Cherkasova | G06F 11/3447 703/23 |
| 8,756,302 | B2 | 6/2014 | Cowan et al. | |
| 9,985,827 | B2 | 5/2018 | Li et al. | |
| 2006/0225079 | A1 * | 10/2006 | Nayak | G06F 9/5027 718/105 |
| 2008/0097801 | A1 * | 4/2008 | MacLellan | G06F 11/3409 709/224 |

(Continued)

*Primary Examiner* — Bradley A Teets
(74) *Attorney, Agent, or Firm* — Neo IP (57) ABSTRACT

Systems and methods for containerized IT intelligence and management. In one embodiment, a system for containerized IT financial management comprises at least one collector, at least one meter, at least one connector, and a reporting dashboard. The at least one collector is customized and connected to at least one container platform. The at least one collector sends capacity and consumption metrics to the at least one meter for processing and aggregation.

19 Claims, 6 Drawing Sheets

(56) References Cited

U.S. PATENT DOCUMENTS

| | | | |
|---|---|---|---|
| 2008/0178190 A1* | 7/2008 | Anstey | H04L 43/028 718/104 |
| 2009/0235267 A1* | 9/2009 | McKinney | G06F 11/328 718/104 |
| 2009/0328050 A1* | 12/2009 | Liu | G06F 9/5088 718/104 |
| 2016/0275469 A1 | 9/2016 | Gendler | |
| 2017/0111241 A1* | 4/2017 | Degioanni | H04L 41/5058 |
| 2017/0250871 A1 | 8/2017 | Frey et al. | |
| 2017/0277568 A1* | 9/2017 | Lu | G06F 9/5027 |
| 2018/0048532 A1* | 2/2018 | Poort | H04L 41/147 |
| 2018/0091516 A1 | 3/2018 | Nixon et al. | |

* cited by examiner

Advanced Configuration for OpenShift

| Field | Description |
|---|---|
| Log Level | Verbosity of the collector logs |
| Use SSL? | Access Kubernetes API over SSL |
| Verify SSL? | Verify Kubernetes SSL certificate. Do not enable if using self-signed certificates. |
| Kubelet Port | Port the Kubernetes API pod is listening on |
| Docker Cgroup namespace | |
| Data Age Period | Age period of data for clean cache. Must be in minutes. |
| Default LAN I/O | A fallback value for LAN I/O speed per node, if the collector cannot determine the actual LAN speed. |
| Default WAN I/O | A fallback value for WAN I/O speed per node, if the collector cannot determine the actual WAN speed. |
| Default Disk I/O | A fallback value for disk I/O speed per node, if the collector cannot determine the actual disk speed. |

FIG. 4

Advanced Configuration for Meter API

| Field | Description |
|---|---|
| Organization ID | Unique ID of the 6fusion Meter Organization to submit inventory under. |
| OAuth Token | OAuth Token for accessing the 6fusion Meter. Leave blank if not enabled. |
| Host | Address of the 6fusion Meter |
| Port | Port of the 6fusion Meter API |
| Use SSL? | Access the 6fusion Meter over SSL |
| Verify SSL? | Verify Meter API SSL certificate. Do not enable if using self-signed certificates. |

FIG. 5

OpenShift Collector

Steps to install the OpenShift Collector plugin outside of the 6fusion Meter cluster.

OpenShift

1. Navigate to the downloaded OpenShift project template file.
2. Confirm the variables in the command below are correct. (You may edit the script to make changes).
3. Copy and run the following commands.

```
PROJECT_NAME=6fusion-openshift-collector
DISPLAY_NAME="6fusion OpenShift Collector"
FILENAME=openshift-collector.yaml
oc new-project $PROJECT_NAME \
    --display-name="$DISPLAY_NAME" \
    --description="Collects inventory and consumption metrics of OpenShift projects"
oc create -f $FILENAME
oc create serviceaccount 6fusion-openshift-collector
oc adm policy add-cluster-role-to-user \
  system:node-reader \
  system:serviceaccount:${PROJECT_NAME}:6fusion-openshift-collector

# The following line grants access to all projects.
for project in `oc projects -q`; do \
  oc adm policy add-role-to-user view -n $project system:serviceaccount:${PROJECT_N
done

# If you prefer to limit access to specific projects, or add new projects,
#   run the following for each desired project (in place of the loop above)
# oc adm policy add-role-to-user view system:serviceaccount:{PROJECT_NAME}:6fusion-
```

Click here to copy the commands

The OpenShift Collector template is now ready to be deployed.
4. In your OpenShift web console, browse to the new 6fusion OpenShift Collector project.
5. Select Add to project.
6. Enter 6fusion in the *Filter by name or description* field to list the template.
7. Click Select.
8. Confirm the field values, then click Create.
9. Your 6fusion OpenShift Collector is now deployed.

FIG. 6

SYSTEMS AND METHODS FOR IT INTELLIGENCE AND MANAGEMENT BASED ON CONTAINER-LEVEL METERING

CROSS-REFERENCES TO RELATED APPLICATIONS

The present invention is related to and claims priority from the following U.S. patent documents: this application claims priority from U.S. Provisional Patent Application No. 62/666,910, filed May 4, 2018, which is incorporated herein by reference in its entirety.

BACKGROUND OF THE INVENTION

Field of the Invention

This invention relates to systems and methods for Information Technology (IT) management. More particularly, the present invention relates to systems and methods for containerized IT intelligence and management.

Description of the Prior Art

The IT technology has gone through the early hardware era, the virtualization era, and the cloud era. Computing resources on premises are reduced significantly to provide flexibility for businesses. In recent years, containerization is revolutionizing IT infrastructures. Different applications consume computing resources in different patterns, and cause waste in purchasing computing resources. Metering capacity and consumption for containerized IT infrastructure has become critical for IT management and optimization.

By way of example the following are relevant prior art documents relating to computing resource management:

U.S. Publication No. 2016/0275469 for "Systems and methods for providing information technology on an as-used basis" by inventor Paul L. Gendler, filed Mar. 18, 2016, describes systems and methods for providing use of information technology in exchange for a fee based more precisely on actual or near actual use. Information technology may include software and/or hardware, which may be grouped into a convergent infrastructure or convergent architecture. Use of the hardware and/or software may be monitored, such as with metering software, by measuring usage metrics to determine resource usage. The raw metrics data may be converted into at least one common unit of measure. The raw or converted metrics may be used to determine a fee based on resource usage. The fee may be based on a fee rate, determined or calculated with reference to various information such as the type of information technology being used. The user may be charged the fee based on actual past usage, an approximation of past usage, an estimation of future usage, or a different usage basis.

U.S. Pat. No. 9,985,827 for "Automated generation of deployment workflows for cloud platforms based on logical stacks" by inventor Li Li, filed May 24, 2016, describes a method implemented in a data center management node. The method includes obtaining, from memory, a physical stack describing a configuration of platform components across multiple operating platforms on a data center infrastructure, generating, by a processor, a graph describing correlations between the operating platforms and the data center infrastructure based on a platform library, wherein the platform library describes configurations of the platform components for each of the operating platforms separately, generating, by the processor, one or more logical stacks based on the graph, wherein the one or more logical stacks indicate deployable configurations of the operating platforms without depicting the platform components, and representing the logic stack to a user.

U.S. Publication No. 2018/0091516 for "Network-accessible resource management system with distributable governance" by inventor Brian Gregory Nixon et al., filed Dec. 18, 2015, describes a resource management system comprising a computer-implemented platform running on at least one computing device, said platform for running a plurality of interoperable resource agents, each resource agent being a representation of at least an aspect of a 5 resource, wherein at least one aspect of governance of each said resource agent is distributable by a first rights holder to any one or more second rights holder; and a communications interface for interfacing said platform and at least one resource-related computing device, each resource-related computing device associated via said communications interface with at least one of said resource agents in accordance with an 10 access contract; wherein governance comprises the ability to authorize the further distribution of any one or more aspect of governance by the at least one second rights holder over at least an aspect of the resource agent over which the first user has governance.

U.S. Publication No. 2017/0250871 for "Skeletal Refresh for Management Platforms" by inventor Jason W. Frey et al., filed Feb. 26, 2016, describes a method of implementations includes determining, by a processing device in a management platform, an occurrence of an inventory event in a computing environment managed by the management platform, wherein the computing environment comprises a plurality of managed objects, and invoking a relationship handler to obtain identifying attributes for a target managed object corresponding to the inventory event. The relationship handler is further to update the identifying attributes and relationship attributes corresponding to the target managed object in an inventory tree maintained by the management platform, the relationship attributes comprising an identification of affiliations between two or more managed objects and for each managed object affiliated to the target managed object, and schedule a job in a message queue to update each of the attributes for the managed object, the detailed attributes comprising attributes of the managed object that are not identifying attributes or relationship attributes.

SUMMARY OF THE INVENTION

The present invention provides systems and methods for containerized IT intelligence and management. In one embodiment, a system for containerized IT financial management comprises at least one collector, at least one meter, at least one connector, and a reporting dashboard. The at least one collector is connected to at least one container platform via at least one Application Programming Interface (API). The at least one collector sends capacity (i.e., inventory) and consumption metrics to the at least one meter for processing and aggregation. In one embodiment, multiple collectors are deployed to the same meter. In another embodiment, the at least one collector is deployed separately from the at least one meter. In one embodiment, remote-installation options are available for the at least one collector.

One embodiment of the present invention includes a system for containerized Information Technology (IT) intelligence and management, including a meter platform and at least one analytics platform, wherein the meter platform comprises at least one collector, at least one meter application programming interface (API), and at least one connector, wherein the at least one collector comprises an infrastructure collector container, an inventory collector container, a metrics collector container, and a local database container, wherein the at least one meter API comprises a Workload Allocation Cube (WAC) calculator container, wherein the at least one collector is customized for at least one container platform and is configured to collect and transmit capacity data, consumption data, and cost data from the at least one container platform to the at least one meter, wherein the at least one meter is configured to measure, aggregate, and store the capacity data, the consumption data, and the cost data from the at least one collector, thereby creating meter data, wherein the at least one connector is configured to extract, transform, and load the meter data to the at least one analytics platform, and wherein the at least one analytics platform is configured to track computing resource usage, provide insight of the computing resource usage, and optimize the computing resource usage of the at least one container platform in real time.

Another embodiment of the present invention includes a system for containerized Information Technology (IT) intelligence and management, including at least one collector, at least one meter, and at least one connector, and at least one analytics platform, wherein the at least one collector comprises an infrastructure collector container, an inventory collector container, a metrics collector container, and a local database container, wherein the at least one meter comprises at least one meter application programming interface (API), wherein each of the at least one meter API comprises a Workload Allocation Cube (WAC) calculator container, wherein the at least one collector is customized for at least one container platform and is configured to collect and transmit sample data for processor usage, memory usage, storage usage, Disk I/O, LAN I/O, and WAN I/O from the at least one container platform to the at least one meter, wherein the at least one meter is configured to measure consumption of the at least one container platform based on the sample data from the at least one collector, thereby creating meter data, wherein the at least one connector is configured to extract, transform, and load the meter data to the at least one analytics platform, and wherein the at least one analytics platform is configured to track computing resource usage, provide insight of the computing resource usage, and optimize the computing resource usage of the at least one container platform in real time. Yet another embodiment of the present invention includes a method for containerized Information Technology (IT) intelligence and management, including providing at least one collector, at least one meter, at least one connector, and at least one analytics platform, wherein the at least one collector is customized for at least one container platform, wherein the at least one collector comprises an infrastructure collector container, an inventory collector container, a metrics collector container, and a local database container, wherein the at least one meter comprises at least one meter application programming interface (API), wherein each of the at least one meter API comprises a Workload Allocation Cube (WAC) calculator container, the at least one collector collecting and transmitting consumption data, capacity data, and cost data from the at least one container platform to the at least one meter, the at least one meter measuring, aggregating, and storing the capacity data, the consumption data, and the cost data from the at least one collector, thereby creating meter data, the at least one connector extracting, transforming, and loading the meter data to the at least one analytics platform, and the at least one analytics platform tracking computing resource usage, providing insight of the computing resource usage, and optimizing the computing resource usage of the at least one container platform based on the meter data in real time.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 6 displays a dialogue with deployment instructions for an OpenShift collector.

DETAILED DESCRIPTION

Cloud computing provides the ability to deliver and consume computing resources as needed. It allows the hardware requirement on premises to be reduced significantly. Furthermore, it is flexible to increase or decrease computing capacity based on demand. Cloud computing thus creates huge opportunities for companies, big or small, to right-size spend, matching to the needs for any given hour of the day.

Containerization is operating-system-level virtualization. In operating-system-level virtualization, the core operating system allows the existence of multiple isolated user-space instances, which are called containers. Containers provide development velocity and scalability. However, containers reintroduce huge waste back into the purchasing equation for businesses. Unlike an instance, the lifespan of a container can be as little as seconds and requires a tiny amount of computing resources to complete its task. The smallest instance can accommodate many running containers and each container uses a variable amount of computing resources. Paying by the instance hour is inefficient and causes the amount of wasted spend to increase significantly. Given the highly dynamic and wildly volatile nature of container technology usage, tracking and reporting the true cost of delivering application services is nearly impossible. The true cost includes costs for a plurality of computing resource types including processors (CPUs), memory, storage, input/output (I/O), and local and wide area network resources. The root of the problem is that in the world of containers, granular visibility at the server, virtual machine or even instance level is not good enough. In other words, with the container technology, the abstraction layer from public or private infrastructure provides development velocity and scalability, but also creates financial friction.

The present invention provides systems and methods for containerized IT intelligence and management. The true cost of operating container platforms is determined at the most granular level, and the container platforms are operated and managed efficiently based on the true cost. Systems and methods of the present invention also provide utility style billing for internal business units and external customers based on the true cost, and therefore enable billing and paying for containerized application services like a utility.

The present invention relates to IT metering infrastructure disclosed in U.S. Pat. No. 8,756,302, which is incorporated herein by reference in its entirety.

In one embodiment, the present invention provides cloud native application metering for Original Equipment Manufacturers (OEMs), resellers, and partners. In one embodiment, containerized consumption of IT infrastructure is analyzed by application and/or service. Containerized consumption reports are delivered for billing, cost recovery, and software governance. In one embodiment, the present invention provides metering and managing computing resources as a service for containerized IT infrastructure.

In one embodiment, the present invention provides collectors for containerized metering. Enterprises are enabled to have the same type of access and control, get specific applications into production much faster, and provide more efficient service for customers.

As application services further separate from underlying infrastructure, it becomes harder for developers, operators, and financial officers to have meaningful insights into optimized asset utilization. The systems and methods of the present invention are operable to discover and deliver customer hosts, capacity, containers, and application services in real time to solve this problem. The systems and methods of the present invention further provide a full view of resources consumed from the infrastructure layer up through containers and projects using a single, standardized approach to measuring consumption of containerized IT infrastructure across hybrid cloud and on-premises assets. The systems and methods in the present invention further provide optimized solutions based on actual consumptions and costs in containerized IT infrastructure, thereby defining a true cost for commercial provision of infrastructure-as-a-service.

In one embodiment, a system for containerized IT management includes at least one collector, at least one meter, at least one connector, and a reporting dashboard. The at least one collector is connected to at least one container platform via at least one API. The at least one collector sends capacity (i.e., inventory) and consumption metrics to the at least one meter for processing and aggregation. In one embodiment, the system is operable to deploy multiple collectors to the same meter. In one embodiment, the at least one collector is deployed separately from the at least one meter. In one embodiment, remote-installation options are available for the at least one collector. In one embodiment, there is a first level of specific collectors collecting data from specific metered infrastructure on one end and transmitting the collected data to a second level of general collectors on the other end, which in turn loads the collected data to the at least one meter.

Preferably, the at least one collector determines and measures application consumption of IT capacity using a unit-of-measure for IT infrastructure as disclosed in U.S. Pat. No. 8,756,302, which is incorporated herein by reference in its entirety. In one embodiment, the unit-of-measure is termed as a Workload Allocation Cube (WAC) unit including six metrics commonly used in software computing (e.g. MHz for CPU or processor usage, Mbytes for memory usage, Kbytes/sec for I/O, Kbytes/sec for Local Area Network (LAN) usage, Kbits/sec for Wide Area Network (WAN) usage and Gbytes for storage usage) with appropriate weighting and conversion factors. In another embodiment, the unit-of-measure has different variations based on consumption patterns of certain IT infrastructure. For example, but not for limitation, different WACs are derived from the original WAC with different coefficients for different types of usages, such as even standard usage, heavy memory usage, and heavy storage usage.

In one embodiment, the at least one collector is operable to determine and measure the consumption of containers that power applications. Applications that power businesses are optimized based on the consumption measurement. The consumption measurement can be interpreted by service or by Docker image. For example, the highest-used service and/or the most-used software solution can be identified based on the consumption measurement.

In one embodiment, the collector pulls consumption data, capacity data, and cost data from the metered infrastructure. The collector comprises an infrastructure collector, an inventory collector, a metrics collector, and a local database. In another embodiment, the collector further comprises an on-premises connector and a cache cleaner. The inventory collector retrieves a list of containers that will be metered and associated metadata. The list of containers is updated as containers are added or removed for consumption. The list of containers and the associated metadata are stored in the local database. A flag is set to indicate the metered state of the list of containers and record in the local database. For example, but not for limitation, when the flag is set as "false" for a container, it means the container is not metered yet. The metrics collector reads the local database to find records for the list of containers that have the metered state set as "false," collects sample data for CPU usage, memory usage, storage usage, Disk I/O, LAN I/O, and WAN I/O. The metrics collector then updates the records in the local database with the collected sample data. In one embodiment, the on-premises connector reads the local database, and for each record sends the sample data to a meter via a meter API. In one embodiment, the meter API comprises an API container and a WAC calculator container. In another embodiment, the meter API further comprises a cost calculator container, a capacity calculator container, and a data retention manger container. In one embodiment, the meter calculates the consumption (preferably in kWACs) for each sample and creates readings every 5 minutes in an internal datastore. In one embodiment, the meter aggregates the 5-minute readings and creates daily and/or monthly readings for each machine, infrastructure, and organization.

In one embodiment, the present invention provides a meter platform architecture for containerized IT management and optimization. A meter platform is communicatively connected to at least one container platform via at least one collector and at least one analytics platform via at least one connector. The at least one collector collects consumption data, capacity data, and cost data from the at least one container platform and transmits this data to the meter platform. The meter platform measures, aggregates, and stores the consumption data, capacity data, and cost data from the at least one container platform. The at least one connector extracts, transforms, and loads data from the meter platform to the at least one analytics platform. The at least one analytics platform provides insights and optimized solutions for the at least one container platform based on the data obtained from the meter platform via the at least one connector.

The at least one analytics platform is operable to create and deliver consumption reports used for billing, cost recovery, or showback. The consumption reports can be further used to increase capital efficiency and govern software licensing. In one embodiment, the at least one analytics platform provides a planning tool for operators to adjust usage of certain IT infrastructure via a Graphical User Interface (GUI). In one embodiment, the at least one analytics platform provides a contract calculator for consumers to maximize savings from consumption via a GUI. In one embodiment, the at least one analytics platform provides a finance calculator for computing resource providers to track and optimize Return on Investment (ROI) via a GUI based on consumption patterns, contract rates, estimated growth cycles, etc. In one embodiment, an operator is a piece of software for creating, configuring, and managing instances of container applications on behalf of a user. In one embodiment, at least one software operator is constructed and configured for network communication with the meter platform, which connects to at least one analytics platform via at least one connector. The meter platform is operable to measure, aggregate and process data from the container-based applications managed by the at least one software operator. In a cloud environment, the meter platform enables cloud budgeting and cloud billing. Businesses are enabled to track resource usages, view service usage and metrics, and gain insight into how cloud resources are being used.

Referring now to the drawings in general, the illustrations are for the purpose of describing a preferred embodiment of the invention and are not intended to limit the invention thereto.

Figure 1:
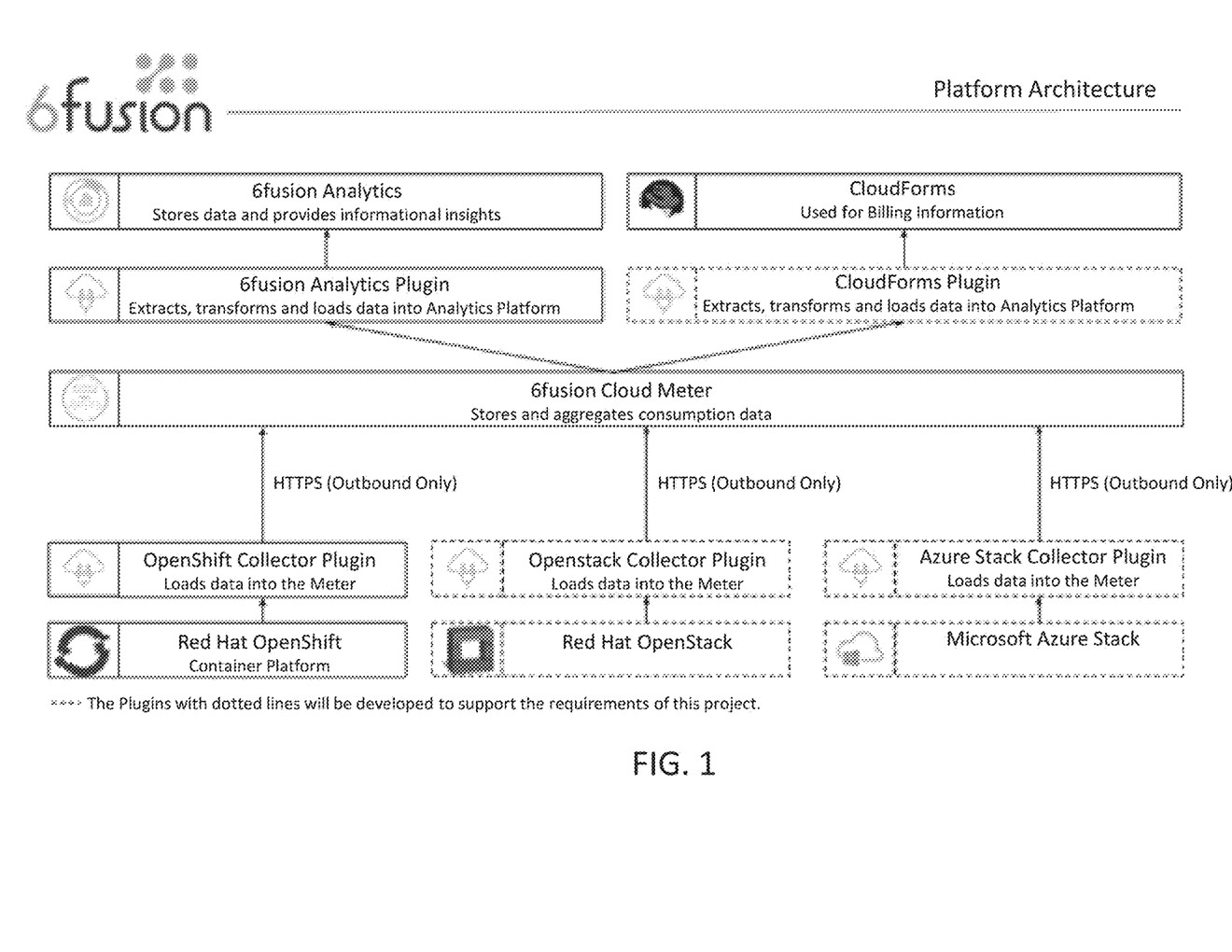
FIG. 1 illustrates a meter platform architecture for providing containerized IT intelligence and management according to one embodiment of the present invention.

FIG. 1 illustrates a meter platform architecture for containerized IT intelligence and management according to one embodiment of the present invention. At least one collector is provided and plugged into corresponding IT infrastructure. The at least one collector pulls consumption data, capacity data, and cost data from the corresponding IT infrastructure and transmits this data to a cloud meter platform. In one embodiment, communications from the at least one collector to the cloud meter platform is one-way only via Hypertext Transfer Protocol Secure (HTTPS). FIG. 1 illustrates three collectors for three different container platforms (i.e., Red Hat OpenShift, Red Hat OpenStack, and Microsoft Azure Stack) as an example but not limitation for the containerized IT infrastructure. The cloud meter platform stores and aggregates data received from the corresponding IT infrastructure via the at least one collector. The cloud meter platform then transmits data to at least one analytics platform via at least one respective connector. In one embodiment, the meter platform architecture comprises at least one analytics platform. The at least one analytics platform is communicatively connected to the cloud meter platform via at least one connector. The at least one connector is operable to extract, transform and load data from the cloud meter platform to the at least one analytics platform. The at least one analytics platform is operable to store data and provide informational insights. In another embodiment, at least one third-party analytics platform is operable to communicatively connect to the meter platform architecture of the present invention via at least one connector customized for the at least one third-party analytics platform. For example, a CloudForms analytics platform is connected to the cloud meter platform of the present invention via a CloudForms connector. In FIG. 1, the CloudForms connector is shown as a CloudForms plugin. CloudForms is an enterprise grade multi-cloud management platform that helps operations set up policy controlled, self-service environments for cloud users, detect and respond to environment changes by tracking activities, capturing events, and sensing configuration changes. The CloudForms analytics platform is operable to create billing information based on data aggregated from the cloud meter platform.

Figure 2:
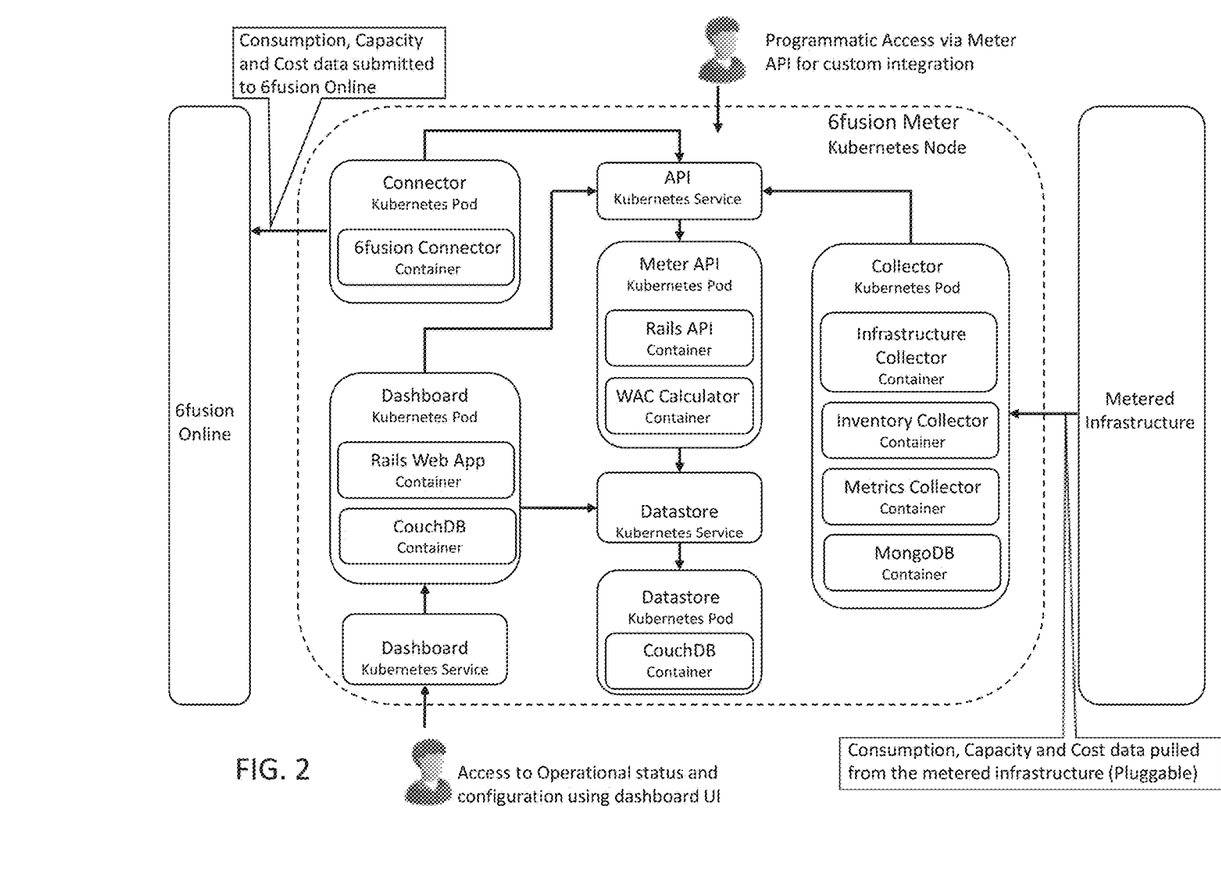
FIG. 2 illustrates components of a meter platform for providing containerized IT intelligence and management according to another embodiment of the present invention.

FIG. 2 illustrates components of a meter platform for containerized IT intelligence and management according to another embodiment of the present invention. In one exemplary embodiment, provided for illustration purposes, the platform architecture is a Kubernetes node. Kubernetes is a portable, extensible open-source platform for managing containerized workloads and services, that facilitates both declarative configuration and automation. A Kubernetes node is a virtual machine or a physical machine. A Kubernetes pod is a Kubernetes abstraction that represents a group of one or more application containers and some shared resources for those containers. A Kubernetes service is a Kubernetes abstraction which defines a logical set of Kubernetes pods and a policy by which to access them.

The meter platform includes at least one collector. By way of illustration but not limitation, the meter platform includes one collector. In one embodiment, the collector is a set of Kubernetes pods comprising an infrastructure collector, an inventory collector, a metrics collector, and a local MongoDB database. MongoDB is a free and open-source cross-platform document-oriented database program. The collector pulls consumption data, capacity data and cost data from the metered infrastructure.

The meter platform also includes a meter API providing programmatic access for custom integration. In one embodiment, the meter API comprises a Kubernetes service meter API and a Kubernetes pod meter API. The Kubernetes service meter API defines and connects to the Kubernetes pod meter API, which comprises a Rails API container and a WAC calculator container. Rails is a server-side web application framework written in Ruby under the MIT License.

The meter platform also includes a datastore. The datastore comprises a Kubernetes service datastore and a Kubernetes pod datastore. The Kubernetes service datastore defines and connects to the Kubernetes pod datastore. In one embodiment, the Kubernetes pod datastore comprises a CouchDB container. CouchDB is open source database software that focuses on ease of use and having a scalable architecture.

The meter platform further includes a dashboard providing access to operational status and configuration of the metered infrastructure via a dashboard user interface. The dashboard comprises a Kubernetes service dashboard and a Kubernetes pod dashboard. The Kubernetes service dashboard defines and connects to the Kubernetes pod dashboard. The Kubernetes pod dashboard comprises a Rails Web App container and a CouchDB container. The Kubernetes pod dashboard is operable to access the Kubernetes service datastore and the Kubernetes service meter API.

The meter platform further includes a connector for submitting consumption data, capacity data, and cost data to an analytics platform online. In one embodiment, the connector is a Kubernetes pod comprising a connector container.

In one embodiment, a collector is customized and configured for a specific container platform environment and a meter platform. The collector communicates with an API of the specific container platform environment for aggregating capacity and consumption metrics and transmits to the meter platform for processing and aggregating via an API of the meter platform. In one embodiment, multiple collectors of multiple different container platform environments are deployed to the same meter platform. In one embodiment, collectors are configured and installed remotely. As an example, but not for limitation, FIGS. 3-6 illustrates configuration and installation of a collector according to one embodiment of the present invention.

Figure 3:
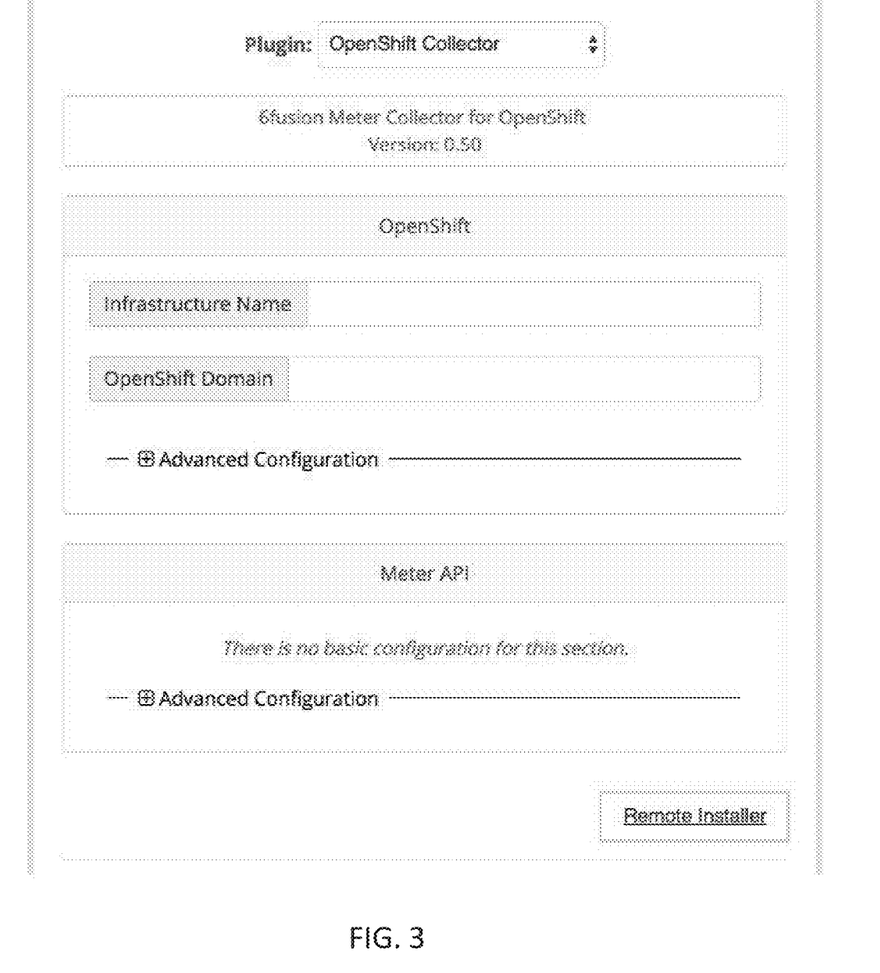
FIG. 3 is a user interface for configuration and installation of a collector according to one embodiment of the present invention.

FIG. 3 displays a user interface for configuration and installation of a collector according to one embodiment of the present invention. In one embodiment, an OpenShift collector is selected to install in an OpenShift container platform environment. The OpenShift collector communicates with the OpenShift API to collect inventory and consumption metrics from the OpenShift container platform environment. The metrics are then sent to a meter platform for processing and aggregation via a meter API.

Figure 4:
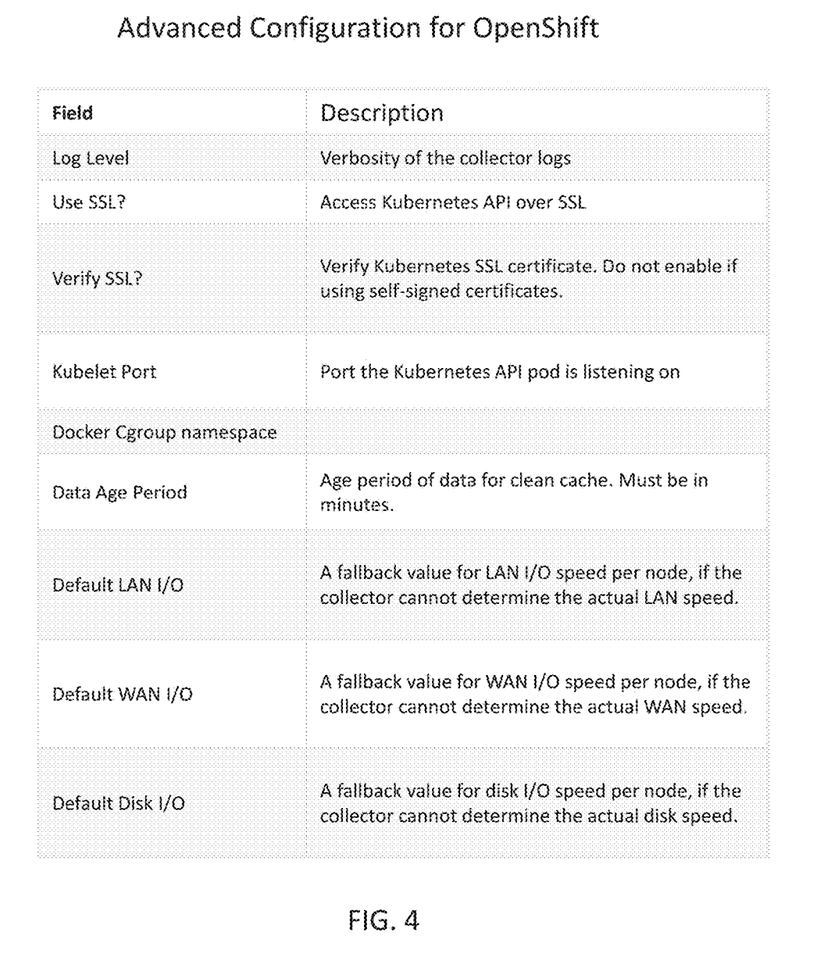
FIG. 4 displays a list of fields in Advanced Configuration for a container platform environment.
Figure 5:
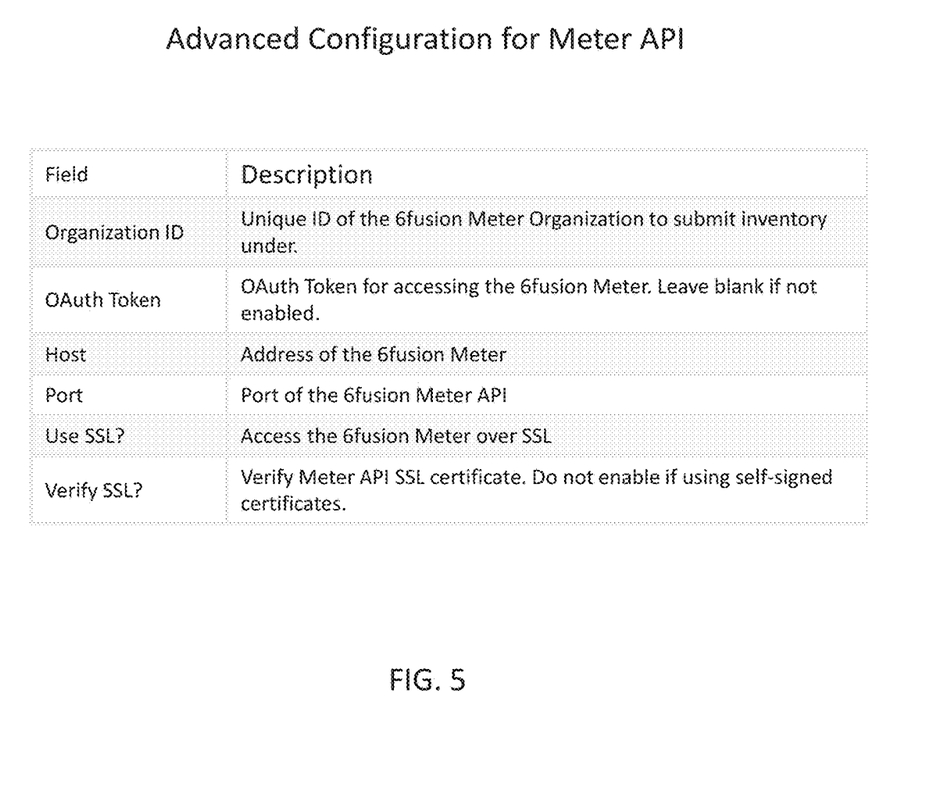
FIG. 5 displays a list of fields in Advanced Configuration for a meter API.

Information for Infrastructure Name and OpenShift Domain is required for collector configuration. The Infrastructure Name is a unique name to be applied to the OpenShift cluster, which provides for distinguishing between applications deployed to different OpenShift environments. The OpenShift Domain is the domain of an OpenShift Dedicated Cluster. For example, if an OpenShift console is accessible at console.6fusion.openshift.com, the 6fusion.openshift.com is entered as the OpenShift Domain. FIG. 4 displays a list of fields in Advanced Configuration for an OpenShift environment. FIG. 5 displays a list of fields in Advanced Configuration for the meter API.

By click-selecting "Remote Installer," an OpenShift-compatible YAML file is downloaded by a browser to a local file system. A dialogue with deployment instructions then appears as shown in FIG. 6. A link is provided near the bottom-left of the dialogue to simplify copying the script content.

In one embodiment, if the meter is not deployed within an OpenShift environment, the meter API should access to the OpenShift environment network on port 443 so that the OpenShift collector communicates with the meter.

The present invention solves a technical problem of wasting computing resources in containerized IT infrastructure by measuring and optimizing capacity and consumption of container platforms with an advanced measurement unit. Container platforms are in network communication via customized collectors. The solutions are not well-understood, routine, or conventional. The present invention provides improvements to containerized IT intelligence and management, which is inextricably tied to computer technology. The solutions provided by the present invention are necessarily rooted in computer technology in order to overcome problems specifically arising in the realm of computer networks.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for containerized Information Technology (IT) intelligence and management, comprising:
   a meter platform and at least one analytics platform;
   wherein the meter platform comprises at least one collector, at least one meter application programming interface (API), and at least one connector;
   wherein the at least one collector comprises an infrastructure collector container, an inventory collector container, a metrics collector container, a local database container, and an on-premises connector;
   wherein the at least one collector is customized for at least one container application platform with information comprising an infrastructure name, a domain name, a log level, whether to use an Secure Sockets Layer (SSL), whether to verify the SSL, a Kubelet port, a Docker Cgroup namespace, a data age period, a default Local Area Network (LAN) Input/Output (I/O), a default Wide Area Network (WAN) I/O, and a default Disk I/O;
   wherein the infrastructure name is a unique name to be applied to a container cluster in a container environment, wherein the domain name is for a dedicated cluster in the container environment, wherein the log level indicates a verbosity of a collector log, wherein whether to use an SSL indicates access to a Kubernetes API over the SSL or not, wherein whether to verify the SSL indicates verifying a Kubernetes SSL certificate or not, wherein the Kubelet port is a port that a Kubernetes API pod is listening on, wherein the data age period is an age period of data for clean cache, wherein the default LAN I/O is a fallback value for LAN I/O speed per node if the at least one collector cannot determine an actual LAN speed, wherein the default WAN I/O is a fallback value for WAN I/O speed per node if the at least one collector cannot determine an actual WAN speed, and wherein the default Disk I/O is a fallback value for disk I/O speed per node if the collector cannot determine the actual disk speed;
   wherein the at least one meter API comprises a Workload Allocation Cube (WAC) calculator container, wherein the at least one meter API is configured with information comprising an organization ID, an Open Authorization token, a host address, a port, whether to use an SSL for the at least one meter API, and whether to verify the SSL for the at least one meter API;
   wherein the inventory collector container is operable to retrieve a list of application containers for metering from each container application platform, wherein the list of application containers is updated as application containers are added or removed for consumption;
   wherein the local database container is operable to store the list of application containers, a metered state of each application container in the list of application containers, and associated metadata;
   wherein the metrics collector container is operable to collect sample data of processor usage, memory usage, storage usage, Disk I/O, LAN I/O, and WAN I/O from application containers not metered yet;
   wherein the on-premises connector is operable to transmit the sample data to the at least one meter API;
   wherein the at least one meter API is configured to measure consumption of the at least one container application platform based on the sample data, thereby creating meter data;
   wherein the at least one connector is configured to extract, transform, and load the meter data to the at least one analytics platform; and
   wherein the at least one analytics platform is configured to track computing resource usage, provide insight into the computing resource usage, and optimize the computing resource usage of the at least one container application platform in real time.

2. The system of claim 1, wherein the at least one collector comprises a first level of specific collectors collecting data from the at least one container application platform and a second level of general collectors transmitting the data from the first level of specific collectors to the at least one meter.

3. The system of claim 1, wherein the at least one meter API further comprises a cost calculator container, a capacity calculator container, and a data retention manger container.

4. The system of claim 1, wherein the at least one meter is operable to measure consumption of the at least one container application platform and create readings every 5 minutes in an internal datastore, and wherein the at least one meter is operable to aggregate the 5-minute readings and creates daily and/or monthly readings for the at least one container application platform.

5. The system of claim 1, wherein the meter platform is constructed as a Kubernetes node, wherein the at least one collector is constructed as a Kubernetes pod, wherein the at least one connector is constructed as a Kubernetes pod, and wherein the at least one meter API is constructed as a Kubernetes pod.

6. The system of claim 1, wherein the WAC calculator container is operable to calculate six metrics including processor usage, memory usage, storage usage, Disk I/O, LAN I/O, and WAN I/O with weighting factors based on computing resource types for the at least one container application platform.

7. The system of claim 1, wherein the meter platform further comprises a reporting dashboard providing access to operational status and configuration of the at least one container application platform.

8. The system of claim 1, wherein the at least one analytics platform is operable to create and deliver consumption reports for at least one of billing, cost recovery, and showback for the at least one container application platform.

9. The system of claim 1, wherein the at least one analytics platform comprises a planning tool for operators to adjust usage of certain IT infrastructure by the at least one container application platform.

10. The system of claim 9, wherein the operators are software-based, and wherein the software-based operators are constructed and configured for network communication with the meter platform.

11. The system of claim 1, wherein the at least one analytics platform comprises a contract calculator for consumers to maximize savings from consumption.

12. The system of claim 1, wherein the at least one analytics platform provides a finance calculator for computing resource providers to track and optimize Return on Investment (ROI) based on at least one of consumption patterns, contract rates, and estimated growth cycles.

13. The system of claim 1, wherein the metered state of each application container is indicated by a flag, and wherein the flag is set as false for an application container not metered yet.

14. The system of claim 1, wherein the metrics collector container is further operable to read the metered state of each application container stored in the local database container.

15. The system of claim 1, wherein the metrics collector container is further operable to update the metered state of each application container stored in the local database container based on the sample data.

16. The system of claim 1, wherein the organization ID is a unique ID of the meter platform to submit inventory under, wherein the Open Authorization token is for accessing the meter platform, wherein the host address is an address of the meter platform, wherein the port is a port of the at least one meter API, wherein whether to use an SSL for the at least one meter API indicates accessing the meter platform over the SSL or not, and wherein whether to verify the SSL for the at least one meter API indicates verifying an SSL certificate for the at least one meter API or not.

17. A system for containerized Information Technology (IT) intelligence and management, comprising:
at least one collector, at least one meter, and at least one connector, and at least one analytics platform;
wherein the at least one collector comprises an infrastructure collector container, an inventory collector container, a metrics collector container, a local database container, and an on-premises connector;
wherein the at least one collector is customized for at least one container application platform, with information comprising an infrastructure name, a domain name, a log level, whether to use an Secure Sockets Layer (SSL), whether to verify the SSL, a Kubelet port, a Docker Cgroup namespace, a data age period, a default Local Area Network (LAN) Input/Output (I/O), a default Wide Area Network (WAN) I/O, and a default Disk I/O;
wherein the infrastructure name is a unique name to be applied to a container cluster in a container environment, wherein the domain name is for a dedicated cluster in the container environment, wherein the log level indicates a verbosity of a collector log, wherein whether to use an SSL indicates access to a Kubernetes API over the SSL or not, wherein whether to verify the SSL indicates verifying a Kubernetes SSL certificate or not, wherein the Kubelet port is a port that a Kubernetes API pod is listening on, wherein the data age period is an age period of data for clean cache, wherein the default LAN I/O is a fallback value for LAN I/O speed per node if the at least one collector cannot determine an actual LAN speed, wherein the default WAN I/O is a fallback value for WAN I/O speed per node if the at least one collector cannot determine an actual WAN speed, and wherein the default Disk I/O is a fallback value for disk I/O speed per node if the collector cannot determine the actual disk speed;
wherein the at least one meter comprises at least one meter application programming interface (API), wherein each of the at least one meter API comprises a Workload Allocation Cube (WAC) calculator container, wherein the at least one meter API is configured with information comprising an organization ID, an Open Authorization token, a host address, a port, whether to use an SSL for the at least one meter API, and whether to verify the SSL for the at least one meter API;
wherein the inventory collector container is operable to retrieve a list of application containers for metering from each container application platform, wherein the list of application containers is updated as application containers are added or removed for consumption;
wherein the local database container is operable to store the list of application containers, a metered state of each application container in the list of application containers, and associated metadata; wherein the metrics collector container is operable to collect sample data for processor usage, memory usage, storage usage, Disk I/O, LAN I/O, and WAN I/O from application containers not metered yet;
wherein the on-premises connector is operable to transmit the sample data to the at least one meter API;
wherein the at least one meter is configured to measure consumption of the at least one container application platform based on the sample data from the at least one collector, thereby creating meter data;

wherein the at least one connector is configured to extract, transform, and load the meter data to the at least one analytics platform; and wherein the at least one analytics platform is configured to track computing resource usage, provide insight into the computing resource usage, and optimize the computing resource usage of the at least one container application platform in real time.

18. A method for containerized Information Technology (IT) intelligence and management, comprising:

providing at least one collector, at least one meter, at least one connector, and at least one analytics platform, wherein the at least one collector is customized for at least one container application platform, wherein the at least one collector comprises an infrastructure collector container, an inventory collector container, a metrics collector container, a local database container, and an on-premises connector, wherein the at least one meter comprises at least one meter application programming interface (API), wherein each of the at least one meter API comprises a Workload Allocation Cube (WAC) calculator container;

customizing the at least one collector for at least one container application platform with information comprising an infrastructure name, a domain name, a log level, whether to use an Secure Sockets Layer (SSL), whether to verify the SSL, a Kubelet port, a Docker Cgroup namespace, a data age period, a default Local Area Network (LAN) Input/Output (I/O), a default Wide Area Network (WAN) I/O, and a default Disk I/O;

wherein the infrastructure name is a unique name to be applied to a container cluster in a container environment, wherein the domain name is for a dedicated cluster in the container environment, wherein the log level indicates a verbosity of a collector log, wherein whether to use an SSL indicates access to a Kubernetes API over the SSL or not, wherein whether to verify the SSL indicates verifying a Kubernetes SSL certificate or not, wherein the Kubelet port is a port that a Kubernetes API pod is listening on, wherein the data age period is an age period of data for clean cache, wherein the default LAN I/O is a fallback value for LAN I/O speed per node if the at least one collector cannot determine an actual LAN speed, wherein the default WAN I/O is a fallback value for WAN I/O speed per node if the at least one collector cannot determine an actual WAN speed, and wherein the default Disk I/O is a fallback value for disk I/O speed per node if the collector cannot determine the actual disk speed;

configuring the at least one meter API with information comprising an organization ID, an Open Authorization token, a host address, a port, whether to use an SSL for the at least one meter API, and whether to verify the SSL for the at least one meter API;

the inventory collector container retrieving a list of application containers for metering from each container application platform, wherein the list of application containers is updated as application containers are added or removed for consumption;

the local database container storing the list of application containers, a metered state of each application container in the list of application containers, and associated metadata;

the metrics collector container collecting sample data of processor usage, memory usage, storage usage, Disk I/O, LAN I/O, and WAN I/O from application containers not metered yet;

the on-premises connector transmitting the sample data to the at least one meter;

the at least one meter measuring consumption of the at least one container application platform based on the sample data, thereby creating meter data;

the at least one connector extracting, transforming, and loading the meter data to the at least one analytics platform; and the at least one analytics platform tracking computing resource usage, providing insight into the computing resource usage, and optimizing the computing resource usage of the at least one container application platform based on the meter data in real time.

19. The method of claim 18, further comprising the WAC calculator container calculating six metrics including processor usage, memory usage, storage usage, Disk I/O, LAN I/O, and WAN I/O with weighting factors based on computing resource types for the at least one container application platform.

* * * * *